United States Patent
Pfaffelhuber

(10) Patent No.: US 9,242,428 B2
(45) Date of Patent: Jan. 26, 2016

(54) MULTILAYER COMPONENT AND METHOD FOR PRODUCING THE SAME

(71) Applicant: Roechling Automotive AG & Co. KG, Mannheim (DE)

(72) Inventor: Klaus Pfaffelhuber, Augsburg (DE)

(73) Assignee: ROECHLING AUTOMOTIVE SE & CO. KG, Mannheim (DE)

( * ) Notice: Subject to any disclaimer, the term of this patent is extended or adjusted under 35 U.S.C. 154(b) by 101 days.

(21) Appl. No.: 13/869,103

(22) Filed: Apr. 24, 2013

(65) Prior Publication Data

US 2013/0309464 A1    Nov. 21, 2013

(30) Foreign Application Priority Data

May 3, 2012 (DE) .......................... 10 2012 207 365

(51) Int. Cl.

| | |
|---|---|
| B29C 43/20 | (2006.01) |
| B29C 65/02 | (2006.01) |
| B32B 5/26 | (2006.01) |
| B29C 43/14 | (2006.01) |
| B32B 5/02 | (2006.01) |
| B29C 51/08 | (2006.01) |
| B29L 31/30 | (2006.01) |
| B29C 51/00 | (2006.01) |
| B29C 51/14 | (2006.01) |
| B29C 43/00 | (2006.01) |

(52) U.S. Cl.
CPC ................ *B32B 5/26* (2013.01); *B29C 43/146* (2013.01); *B32B 5/022* (2013.01); *B29C 43/003* (2013.01); *B29C 51/004* (2013.01); *B29C 51/082* (2013.01); *B29C 51/145* (2013.01); *B29L 2031/3005* (2013.01); *B32B 2250/20* (2013.01); *B32B 2262/0253* (2013.01); *B32B 2262/0284* (2013.01); *B32B 2262/04* (2013.01); *B32B 2262/101* (2013.01); *B32B 2307/102* (2013.01); *B32B 2307/304* (2013.01); *B32B 2307/734* (2013.01); *B32B 2605/08* (2013.01); *Y10T 428/24942* (2015.01); *Y10T 442/659* (2015.04)

(58) Field of Classification Search
CPC ................ B32B 2038/0048; B32B 2038/006; B32B 2038/0088; B32B 2260/02; B32B 2250/20; B32B 38/0032; B32B 38/0036; B32B 37/04; B29C 43/14; B29C 43/146; B29C 2043/143

See application file for complete search history.

(56) References Cited

U.S. PATENT DOCUMENTS

| | | | |
|---|---|---|---|
| 5,491,186 A * | 2/1996 | Kean et al. ........................ 524/13 |
| 6,034,009 A | 3/2000 | Sato | |
| 6,509,078 B1 | 1/2003 | Beckmann | |
| 6,695,939 B1 * | 2/2004 | Nakamura ............ B29C 43/203 |
| | | | 156/222 |
| 2003/0162461 A1 * | 8/2003 | Balthes .......................... 442/411 |
| 2009/0111348 A1 * | 4/2009 | Shoyama ............... D03D 11/00 |
| | | | 442/414 |
| 2010/0219561 A1 | 9/2010 | Pfaffelhuber et al. | |

* cited by examiner

*Primary Examiner* — Matthew Daniels
(74) *Attorney, Agent, or Firm* — Rothwell, Figg, Ernst & Manbeck, P.C.

(57) ABSTRACT

The present invention relates to a method of producing a multilayer component comprising the following steps: providing a mat-like multilayer structure which comprises at least two outer layers and a core layer, the core layer being arranged between the two outer layers, the core layer comprising a fiber tangle, which contains a binder material and a reinforcing fiber material, a melting point of the binder material being lower than a melting point of the reinforcing fiber material, placing the multilayer structure in a press, heating the multilayer structure in the press with exposure to pressure, such that the binder material melts, while the reinforcing fiber material retains its fiber structure, resulting in formation of a semi-finished product, lofting the semi-finished product, processing the semi-finished product to yield the multilayer component and cooling the component.

20 Claims, 2 Drawing Sheets

MULTILAYER COMPONENT AND METHOD FOR PRODUCING THE SAME

CROSS REFERENCE TO RELATED APPLICATION

Figure 1:
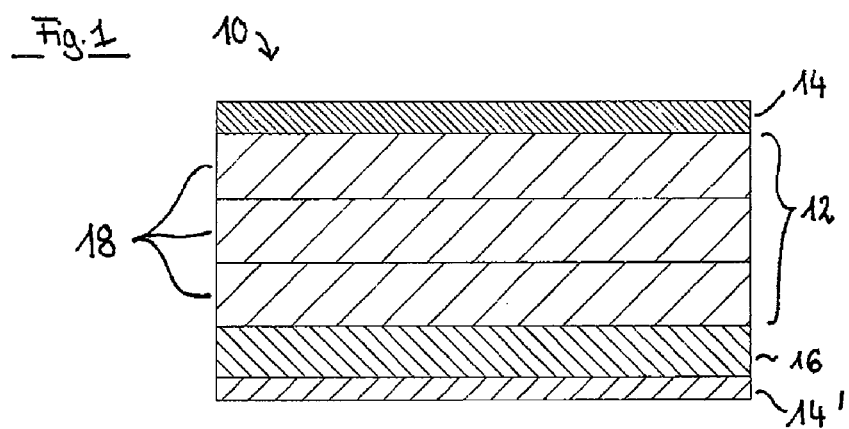

This application claims the benefit of German Patent Application No. 10 2012 207 365.5 filed on May 3, 2012, the disclosure of which is incorporated herein in its entirety by reference.

According to a first aspect, the present invention relates to a method for producing a multilayer component, in particular a trim or housing component for a motor vehicle, comprising the provision of a mat-like multilayer structure, which comprises at least two outer layers and a core layer, the core layer being arranged between the two outer layers. The core layer comprises a fibre tangle, which contains a binder material and a reinforcing fibre material, the melting point of the binder material being lower than the melting point of the reinforcing fibre material. The method further comprises the following steps: placing the multilayer structure in a press, heating the multilayer structure in the press with exposure to pressure, such that the binder material melts, while the reinforcing fibre material retains its fibre structure, so resulting in the formation of a semi-finished product, lofting the semi-finished product, processing, in particular shaping, the semi-finished product to yield the multilayer component and cooling the component.

With the above-described, generic method, such as is described for example in document WO2007/000225 A1, components may be made from "LWRT" materials (low-weight reinforced thermoplastics), which combine low component weight with good sound-absorbing properties and high inherent rigidity.

These properties make LWRT materials particularly suitable for producing trim or housing components for motor vehicles, which may serve in thermal insulation, for example of the engine compartment, and/or in absorption of undesired noise.

In the known method, the core layer and the outer layers of the multilayer structure are compressed together in a hot press and heated to a temperature at which the binder material melts, while the reinforcing material retains its fibre structure. The binder material then binds together the reinforcing fibres and the individual layers, so resulting in the semi-finished product.

Heating under pressure is necessary, because some conventional binder materials shrink on transition into the molten phase and thus heating the multilayer structure without exposure to pressure could result in uncontrolled shrinkage of the entire structure.

If the pressure of the press is reduced after melting the binder material, while said material is still in the molten state, for instance by opening the press, or if the semi-finished product formed in the press is cooled and then heated again to the melting temperature of the binder material at a pressure which is lower than the pressure of the press on heating of the multilayer structure, in particular at atmospheric pressure, the semi-finished product expands due to the restoring forces of the fibres of the reinforcing fibre material, i.e. it increases in thickness. This process is known as "lofting" denotes and results in a porous and thus light, sound-absorbing component.

The properties desired in particular for use as a trim component in the automotive sector, i.e. sound-absorption, thermal insulation and inherent rigidity, in each case improve with component thickness.

Attempts have hitherto been made to increase component thickness by increasing the basis weight of the core layer. However, it has been demonstrated that an increase in basis weight does not result in a proportional increase in material thickness after lofting. A component with a core layer basis weight of about 1000 $g/m^2$, for example, does not achieve twice the thickness of an otherwise identically constructed component with a core layer basis weight of 500 $g/m^2$. Furthermore, the increase in basis weight naturally results, for the same surface area, in an increase in the total weight of the component, which may likewise be disadvantageous, depending on purpose.

The object of the present invention is therefore to develop further the method known from the prior art such that the component thickness of the multilayer component producing using the method is increased while retaining the basis weight.

This object is achieved according to the invention in that the step of providing the multilayer structure comprises selecting said structure such that the core layer comprises at least two superposed core sublayers, each core sublayer comprising a fibre tangle containing a binder material and a reinforcing fibre material, a melting point of the respective binder material being lower for each core sublayer than a melting point of the respective reinforcing fibre material and the binder materials of the core sublayers being mutually compatible. The melting points are here understood to mean the melting temperatures at identical pressure (in particular atmospheric pressure). When using different (compatible) binder materials, the multilayer structure should be heated in the press until all the binder materials melt. Moreover, the highest occurring binder material melting temperature should be lower than the lowest occurring reinforcing fibre material melting temperature.

Tests carried out by the applicant have shown that the expansion (free loft), triggered by heating, for example of a core layer composed of two superposed core sublayers each of 500 $g/m^2$ is markedly greater than the expansion of an otherwise identical individual core layer with a basis weight of 1000 $g/m^2$.

This surprising effect makes it possible, in a simple manner, to produce multilayer components which exhibit a markedly greater component thickness for the same basis weight than the components produced using the known method, so resulting in an improvement in the component rigidity, sound absorption and thermal insulation effect of said components.

Without specifying a particular physical or chemical effect, it may be suspected that effects at the boundary surfaces of the superposed core sublayers play a part in this.

The melting point of the materials may vary through the action of the press pressure. In general, to melt the binder material while retaining the fibre structure of the reinforcing fibre material it should however be sufficient to heat the multilayer structure in the press with exposure to pressure to a temperature which is between the melting temperature of the binder material and that of the reinforcing fibre material at atmospheric pressure, and if different reinforcing fibre materials and binder materials are used, to a temperature between the highest occurring melting temperature of a binder material and the lowest occurring melting temperature of a reinforcing fibre material.

Where material parameters are mentioned in this application, such as for example melting temperatures, these relate, unless explicitly stated otherwise, to standard laboratory conditions, i.e. atmospheric pressure, a relative average atmospheric humidity of 40 to 60% and, if applicable, room temperature, i.e. 20 to 25° C.

If a mat-like component is to be produced, the step of processing the semi-finished product to yield the component can also merely comprise cutting the semi-finished product to the appropriate size before, during or after the lofting step.

To produce a component shaped three-dimensionally in the desired manner, provision may however also be made to shape the semi-finished product produced in the press in a mould with exposure to pressure, preferably with exposure to pressure and heat, to yield a multilayer component of the desired shape. The semi-finished product is preferably placed in the mould, providing that the binder material is substantially still in the molten or shapeable state, or the initially cooled semi-finished product is heated up accordingly beforehand and thus "lofted" before it is placed in the mould. In principle, however, the semi-finished product may also be lofted by heating during the step of shaping it to yield the component.

When carrying out the method according to the invention, use may be made of prefabricated multilayer structures. However, the provision step preferably includes forming the multilayer structure, at least the outer layers and the core sublayers being arranged in such a way one above the other that the core sublayers are superposed and arranged between the two outer layers.

It has been found that expansion of the semi-finished products may be improved markedly in that, during the lofting step, the semi-finished product is heated further for a predetermined heating time or held at a temperature between the melting temperature of the binder material and that of the reinforcing fibre material, such that the restoring movement of the fibres of the reinforcing fibre material is hindered as little as possible by solidification of the binder material.

Tests carried out by the applicant have indicated that the heating time may amount to 3 to 6 minutes, preferably 4 to 5 minutes, since experience shows that after this period the expansion process is substantially complete, at least under the selected test conditions, the semi-finished product being heated in a circulating air oven with an oven temperature of about 200° C. In series operation, radiant heaters (IR heating devices), e.g. at about 190° C. to 200° C., or panel heaters, e.g. at about 220° C. to 240° C. are often used instead of a circulating air oven. In this case, the ideal heating time may possibly need to be adapted, but this can be readily determined by tests. Depending on the specific conditions (type of heating device, temperature, temperature profile, contact between heating device and semi-finished product, composition of semi-finished product, etc.), heating times of about 2 minutes are also possible.

In principle, provision may be made for the core sublayers, which superposed together form the core layer, to comprise different materials, for instance if this is advantageous for a specific application. Not least for reasons of simple disposal, however, it is preferable for the core sublayers to be made from the same materials, meaning that they exhibit the same qualitative composition.

To achieve uniform core layer properties over the thickness thereof, it is additionally possible to provide for core layers substantially to match with regard to quantitative composition, to the extent that for each core sublayer and each material of this core sublayer the proportion of this material in weight percent of the total weight of the core sublayer deviates by at most 10 weight percent, preferably by at most 5 weight percent, particularly preferably by at most 2 weight percent from an arithmetic mean calculated over all the core sublayers. Provision may in particular be made for the core sublayers to exhibit identical quantitative compositions.

Alternatively or in addition, provision may possibly be made for the basis weight of each core sublayer to deviate by at most 10%, preferably by at most 5%, particularly preferably by at most 2% from an arithmetic mean calculated over all the core sublayers, in order to obtain a uniform core layer structure.

The core layer may particularly preferably be constructed from a plurality of identical core sublayers.

At least in the case of more than two core sublayers, the possibility should not be ruled out of arranging other layers between some of these core sublayers. It is preferable, however, for the core sublayers to be arranged directly one above the other, i.e. without the arrangement of a further layer between these core sublayers.

To increase the component thickness further, provision may be made for at least one, preferably a plurality or all of the outer layers likewise to comprise a fibre tangle, which in each case contains a binder material and a reinforcing fibre material, a melting point of the binder material of the respective outer layer being lower than a melting point of the reinforcing fibre material of the respective outer layer.

It is preferable, moreover, for the binder materials of the various outer layers to be compatible with one another and/or with the binder materials of the core layers, in order to achieve satisfactory material cohesion of the component of multilayer construction.

Thus, if the outer layer or outer layers is/are also made from a reinforcing fibre material and a binder material, heating of the pressed semi-finished product may lead likewise to expansion of the outer layers for the reasons stated above, resulting overall in an increased component thickness.

Provision may be made for the core layer and the outer layers to differ in composition and/or in the respective proportions (proportions by weight) of binder material and reinforcing fibre material and/or in the basis weight. Provision may thus be made for the glass fibre content to be lower in the outer layers than in the core layer or for it to be replaced by another reinforcing fibre, in order to make the component more pleasant to handle.

To enable sufficiently thorough mixing of binder material and reinforcing fibres in a simple manner, such that after heating the binder material binds the fibres of the reinforcing fibre material, distributed over the entire component or over the core layer thereof, uniformly together in the desired three-dimensional structure, it is preferable for the binding material of at least one core sublayer and/or at least one outer layer to be present likewise in fibre form prior to heating of the multilayer structure in the press, the respective binder material and the respective reinforcing fibre material preferably being needle-bonded/needle-punched together.

Components with satisfactory properties with regard to insulating effect, sound absorption and inherent rigidity as well as handling characteristics may be produced in that at least one of the outer layers comprises a proportion of reinforcing fibre material of from about 20 to about 30 weight percent, preferably of about 25 weight percent and a proportion of binder material of about 70 to 80 weight percent, preferably of about 75 weight percent.

Provision may likewise be made for at least one of the core sublayers to comprise a proportion of reinforcing fibre material of from about 30 to about 50 weight percent, preferably of about 40 weight percent, and a proportion of binder material of from about 50 to about 70 weight percent, preferably of about 60 weight percent.

In practice it has proved advantageous for at least one of the outer layers to have a basis weight of between 50 g/m² and about 500 g/m², preferably of about 450 g/m² or less and/or at least one of the core sublayers to have a basis weight of between about 50 g/m² and about 600 g/m², preferably of about 500 g/m², particularly preferably of 300 g/m² or 200 g/m² or less.

For example, core sublayers with a basis weight of 300 g/m² exhibit excellent lofting behaviour, and the results of tests performed by the applicant indicate that the result may be improved still further by further reduction of the basis weight of the core sublayers. The intention is thus to use a multilayer structure of core sublayers and/or outer layers with the minimum basis weight achievable for needle-punched nonwovens, for instance in each case around 50 g/m². If films are used for the outer layers instead of nonwovens, the basis weight thereof may be still lower, for example 30 g/m².

According to a further aspect, the present invention likewise relates to a multilayer component, in particular a trim and housing component for a motor vehicle, which comprises at least two outer layers and a porous core layer, the core layer being arranged between the two outer layers. In this case, the core layer comprises a fibre tangle, which contains a binder material and a reinforcing fibre material. As mentioned above, such an LWRT material is known from document WO2007/000225 A1.

In accordance with the explanations given in relation to the method according to the invention, according to the further aspect the object of the present invention is to further develop the known component in such a way that it may exhibit greater component thickness having the same basis weight.

This is achieved according to the invention in that the core layer is formed of at least two separate, superposed core sublayers, a melting point of the respective binder material being lower for each core sublayer than a melting point of the respective reinforcing fibre material and the binder materials of the core sublayers being mutually compatible.

The above description of the method according to the invention already includes some device-related aspects, such that reference is also made to these above explanations to explain the device according to the invention, i.e. the multilayer component according to the invention. Conversely, the explanations relating to the components according to the invention also include method-related aspects, such that reference is also made to these explanations of the components to describe the method in greater detail.

As already explained in greater detail above with regard to the method, provision may be made for the core sublayers to have the same qualitative and/or substantially the same quantitative composition and/or substantially the same basis weight, their preferably being identical in composition and structure. Provision may likewise be made for the sublayers to be directly superposed.

Examples of suitable reinforcing fibre materials for the core sublayers and/or the outer layers are mineral fibres, in particular glass fibres, or plastics fibres, such as polyester fibres, or plant-based fibres, such as cellulose fibres, or a mixture thereof.

The core sublayer and/or outer layer binder material preferably comprises a thermoplastic material, in particular one or more polyolefins, particularly preferably at least one of the following substances: polyethylene, polypropylene, polyester or a mixture thereof.

The applicant reserves the right also to direct claims at a semi-finished product and at a method for producing the latter, the method comprising providing the above-described multilayer structure and heating it in a press with exposure to pressure to the extent that the binder material melts and the reinforcing fibre material retains its fibre structure. Such a sheet- or mat-like semi-finished product, which comprises a core layer arranged between at least two outer layers, said core layer consisting of at least two separate, superposed core sublayers, each core sublayer comprising a binder material and a reinforcing fibre material, a melting point of the respective binder material being lower for each core sublayer than a melting point of the respective reinforcing fibre material, and the binder materials of the core sublayers being mutually compatible, may be produced separately and also sold in the unlofted state, it optionally only subsequently being reheated by the user and lofted in the process.

The present invention is explained in greater detail below with reference to a number of preferred exemplary embodiments, which are shown in appended FIGS. 1 to 5.

Figure 2:
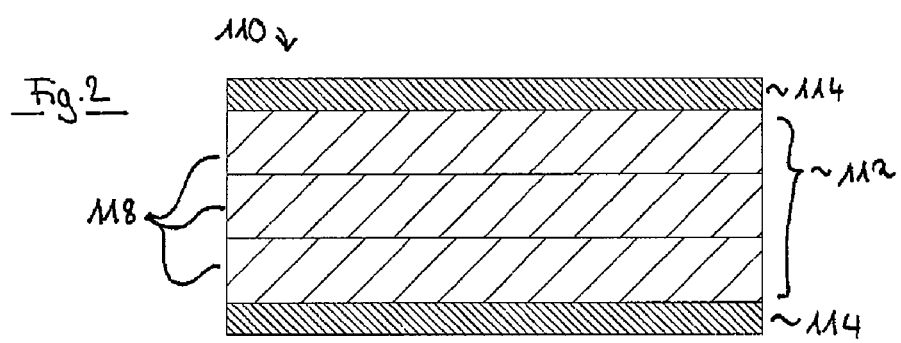
Figure 3:
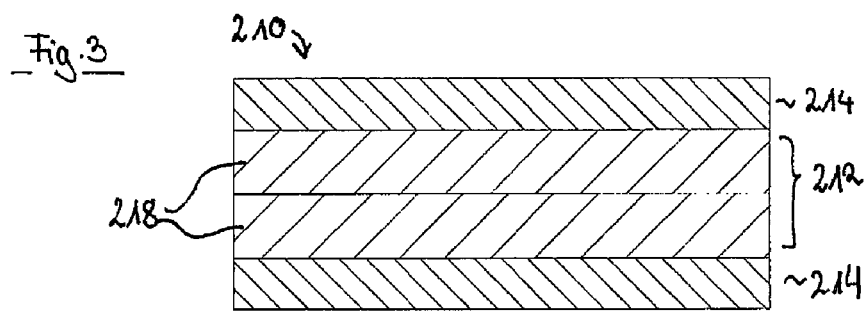
Figure 4:
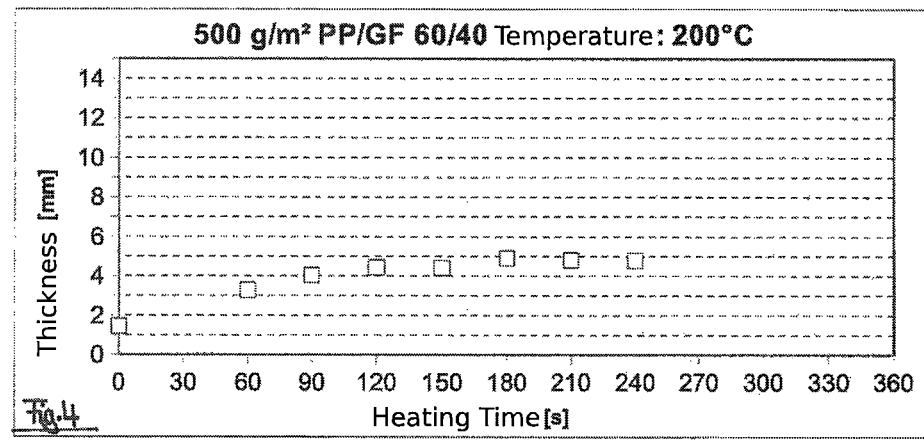
Figure 5:
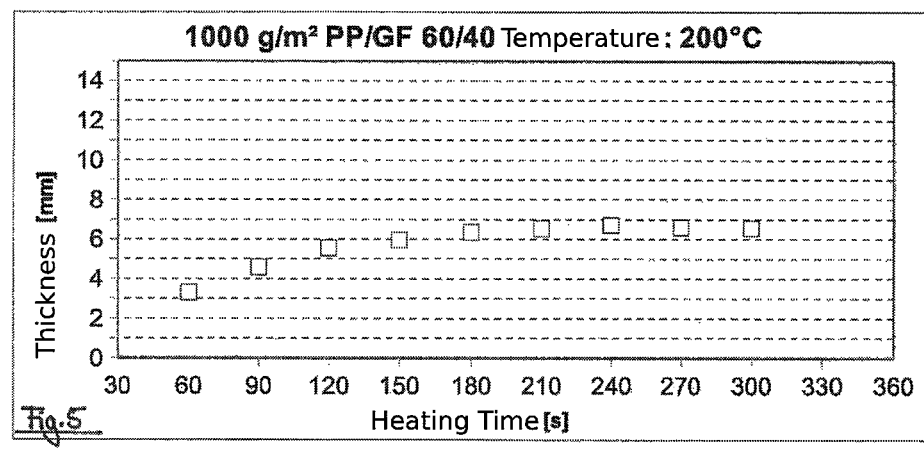

FIG. 1 is a schematic cross-sectional view of a portion of a multilayer structure for a multilayer component according to a first exemplary embodiment of the invention, FIG. 2 is a schematic cross-sectional view of a portion of a multilayer structure for a multilayer component according to a second exemplary embodiment of the invention, FIG. 3 is a schematic cross-sectional view of a portion of a multilayer structure for a multilayer component according to a third exemplary embodiment of the invention, FIG. 4 shows in the form of a diagram the functional relationship between heating time and thickness of a core layer of a generic component and FIG. 5 is a representation corresponding to FIG. 4 showing the same functional relationship for the core layer of a generic component of double the basis weight.

Figure 6:
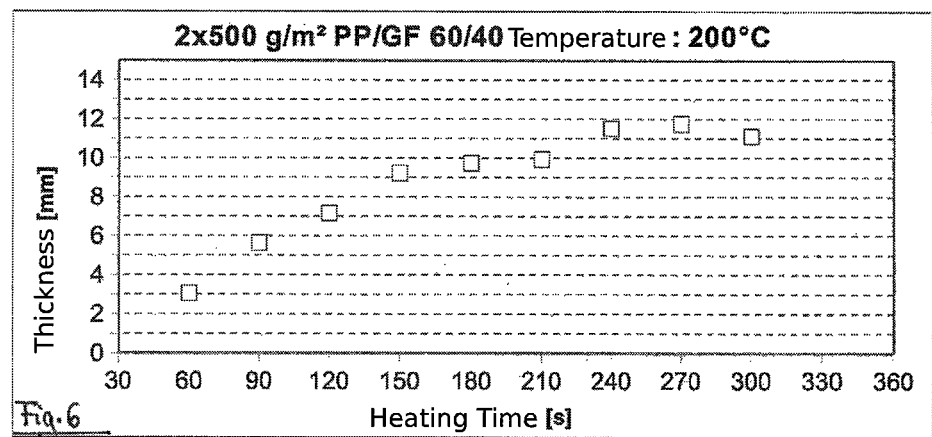

FIG. 6 is a representation corresponding to FIG. 4 showing the same functional relationship for the core layer of a component according to the invention.

As the schematic cross-sectional view illustrated in FIG. 1 shows, the multilayer structure 10, which serves as a starting material for the production of a multilayer component according to the first exemplary embodiment, is constructed of four layers, namely a core layer 12, which is arranged in such a way between two outer layers 14, 14' that the outer layers 14 and 14' virtually completely cover the core layer 12, it also being possible in the present example to arrange a barrier film 16 between one of the outer layers 14 and the core layer 12, which barrier film may for example serve to prevent water penetration through the component.

According to the invention, the core layer 12 is in turn constructed of a plurality of superposed core sublayers 18. In the present case, there may be three core sublayers 18, produced from fibre mats, which each consist of a fibre mix of polypropylene fibres and glass fibres, and each have a basis weight of 500 g/m², such that the entire core layer 12 has a basis weight of about 1500 g/m².

The upper outer layer 14 may be made from a nonwoven fabric of polyethylene terephthalate and viscose fibres and have a basis weight of about 100 g/m², while the lower outer layer 14' may be made from a nonwoven fabric of polypropylene and polyethylene terephthalate fibres and have a basis weight of about 30 g/m².

The water-repellent barrier film 16 may be formed by a polypropylene film with a basis weight of for example 230 g/m².

The multilayer structure 110 according to the second exemplary embodiment shown in FIG. 2 differs from the multilayer structure 10 illustrated in FIG. 1 solely in the outer layers 114, which in this exemplary embodiment are formed by two identical outer layers with a basis weight of about 100 g/m², which may be made from a fibre mix of polyethylene terephthalate and viscose fibres, no barrier film being provided in this second exemplary embodiment.

Features of the second and third exemplary embodiments, which correspond to features of the first exemplary embodiment, are identified by reference numerals made up of the reference numerals used for the corresponding features of the first exemplary embodiment plus the number 100 or 200 respectively. The second and third exemplary embodiments are only explained insofar as they differ from the first exemplary embodiment.

In the third exemplary embodiment of the present invention shown in FIG. 3, the multilayer structure 210 is made from a fibre mat, in which both the core layer 212 and the outer layers 214 are made from a fibre tangle of polypropylene and glass fibres, the glass fibres serving as a reinforcing fibre material and the polypropylene fibres as binder material.

In the example shown in FIG. 3, the proportion by weight of polypropylene fibres to glass fibres in the outer layers 214 may amount to 75:25, and to 60:40 in the core layer. The core layer 212 may be constructed for example from two identical core sublayers 218 with a basis weight of in each case about 500 g/m$^2$, while the outer layers may exhibit a basis weight of about 450 g/m$^2$.

Finally, FIGS. 4 to 6 show as an example measurement results obtained by the applicant, which illustrate the development of the thickness of core layers of polypropylene fibres and glass fibres in the ratio of 60:40 on heating in a circulating air oven at an oven temperature of 200° C. as a function of heating time.

For this purpose, various core layers are firstly heated in a press with exposure to pressure to the extent that the binder material of the respective core layer melts while the fibre structure of the reinforcing fibre material is retained. The pressed semi-finished product was cooled in the press, then the press was opened and the semi-finished product was heated in a circulating air oven at atmospheric pressure and at an oven temperature of 200° C. (i.e. to a temperature above the melting temperature of the PP fibres used as the binder material) and the component thickness was plotted as a function of heating time.

FIG. 4 shows measurement results for a single-layer core layer with a basis weight of 500 g/m$^2$, FIG. 5 measurement results for a single-layer core layer with a basis weight of 1000 g/m$^2$ and FIG. 6 measurement results for a two-layer core layer with two core sublayers each of 500 g/m$^2$.

A comparison of FIGS. 4 and 5 shows that, by doubling the basis weight of the core layer, the component thickness produced by lofting is not doubled but rather just can be increased by less than 50%, since a material thickness of about 5 mm is achieved on the basis of a core layer of 500 g/m$^2$, whereas "only" a material thickness of about 7 mm is achieved on the basis of a core layer of 1000 g/m$^2$.

FIG. 6 documents the surprising result of the applicant's tests, i.e. that free loft can be increased significantly by superposing multiple core sublayers. As the figure shows, a material thickness of more than 11 mm may be achieved by replacing a single-layer core layer with a basis weight of 1000 g/m$^2$ with two superposed core sublayers each of 500 g/m$^2$, i.e. even more than with two individually lofted and then superposed core layers each of 500 g/m$^2$. As the figure further shows, the thickness stabilises after around 4 to 5 minutes.

Overall, the method according to the invention allows the production of multilayer components of distinctly greater thickness for the same basis weight.

The invention claimed is:

1. A method of producing a multilayer component for a motor vehicle, comprising the following steps:
   providing a mat-like multilayer structure, which comprises at least two outer layers and a core layer, the core layer being arranged between the two outer layers, the core layer comprising a fibre tangle, which contains a binder material and a reinforcing fibre material, a melting point of the binder material being lower than a melting point of the reinforcing fibre material, the outer layers comprising a fibre tangle containing a binder material and a reinforcing fibre material having a different proportion by weight of binder material and reinforcing fibre material than the core layer;
   placing the multilayer structure in a press;
   heating the multilayer structure in the press with exposure to pressure, such that the binder material melts, while the reinforcing fibre material retains its fibre structure, resulting in formation of a semi-finished product;
   lofting the semi-finished product;
   processing the semi-finished product to yield the multilayer component;
   and cooling the component;
   wherein providing the multilayer structure comprises selecting said structure such that the core layer comprises at least two superposed core sublayers, each core sublayer comprising a fibre tangle containing a binder material and a reinforcing fibre material, a melting point of the respective binder material being lower for each core sublayer than a melting point of the respective reinforcing fibre material, and the binder materials of the core sublayers being mutually compatible.

2. A method according to claim 1,
wherein the multilayer structure is heated in the press with exposure to pressure to a temperature between the melting temperature of the core binder material and the melting temperature of the core reinforcing fibre material.

3. A method according to claim 1,
wherein the step of providing the multilayer structure comprises forming the latter, at least the outer layers and the core sublayers being arranged such that the core sublayers are superposed and arranged between the two outer layers.

4. A method according to claim 1,
wherein the semi-finished product is heated during the lofting step for a predetermined heating time or held at a temperature between the melting temperature of the core binder material and the melting temperature of the core reinforcing fibre material.

5. A method according to claim 1,
wherein the heating time amounts to 3 to 6 minutes.

6. A method according to claim 1,
wherein for each core sublayer and each material of this core sublayer the proportion of this material in weight percent of the total weight of the core sublayer deviates by at most 10 weight percent from an arithmetic mean calculated over all the core sublayers and/or in that the basis weight of each core sublayer deviates by at most 10% from an arithmetic mean calculated over all the core sublayers.

7. A method according to claim 1,
wherein the core sublayers are directly superposed.

8. A method according to claim 1,
wherein at least one outer layer comprises a fibre tangle, which contains a binder material and a reinforcing fibre material, a melting point of the binder material of the respective outer layer being lower than a melting point of the reinforcing fibre material of the respective outer layer.

9. A method according to claim 1, wherein the binding material of at least one core sublayer and/or at least one outer layer is present in fibre form prior to heating of the multilayer structure in the press.

10. A method according to claim 1, wherein at least one of the outer layers comprises a proportion of reinforcing fibre material of from about 20 to about 30 weight percent and a proportion of binder material of about 70 to about 80 weight percent.

11. A method according to claim 1, wherein at least one of the core sublayers comprises a proportion of reinforcing fibre material of from about 30 to about 50 weight percent and a proportion of binder material of from about 50 to about 70 weight percent.

12. A method according to claim 1, wherein at least one of the outer layers has a basis weight of between about 50 g/m$^2$ and about 500 g/m$^2$ and/or that at least one of the core sublayers has a basis weight of between about 50 g/m$^2$ and about 600 g/m$^2$.

13. A method according to claim 1, wherein the heating time amounts to 4 to 5 minutes.

14. A method according to claim 1, wherein for each core sublayer and each material of this core sublayer the proportion of this material in weight percent of the total weight of the core sublayer deviates by at most 2 weight percent from an arithmetic mean calculated over all the core sublayers and/or in that the basis weight of each core sublayer deviates by at most 2% from an arithmetic mean calculated over all the core sublayers.

15. A method according to claim 1, wherein for each core sublayer and each material of this core sublayer the proportion of this material in weight percent of the total weight of the core sublayer deviates by at most 5 weight percent from an arithmetic mean calculated over all the core sublayers and/or in that the basis weight of each core sublayer deviates by at most 5% from an arithmetic mean calculated over all the core sublayers.

16. A method according to claim 1, wherein at least a plurality of or all of the outer layers comprises a fibre tangle, which contains a binder material and a reinforcing fibre material, a melting point of the binder material of the respective outer layer being lower than a melting point of the reinforcing fibre material of the respective outer layer.

17. A method according to claim 9, further comprising needle-punching the core binder material and the core reinforcing fibre material together.

18. A method according to claim 1, wherein at least one of the outer layers comprises a proportion of reinforcing fibre material of from about 25 weight percent and a proportion of binder material of about 75 weight percent.

19. A method according to claim 1, wherein at least one of the core sublayers comprises a proportion of reinforcing fibre material of 40 weight percent and a proportion of binder material of from about 60 weight percent.

20. A method according to claim 1, wherein at least one of the outer layers has a basis weight of about 450 g/m$^2$ or less, and/or that at least one of the core sublayers has a basis weight of about 500 g/m$^2$ or 400 g/m$^2$ or 300 g/m$^2$ or 200 g/m$^2$ or less.

* * * * *